United States Patent
Plaschka

(10) Patent No.: US 7,861,903 B2
(45) Date of Patent: Jan. 4, 2011

(54) DISPLAY APPARATUS FOR A VEHICLE HAVING A RECEIVER HITCH

(76) Inventor: Brandon Plaschka, 2048 Jackson Rd., Ottawa, KS (US) 66067

( * ) Notice: Subject to any disclaimer, the term of this patent is extended or adjusted under 35 U.S.C. 154(b) by 1076 days.

(21) Appl. No.: 11/535,369

(22) Filed: Sep. 26, 2006

(65) Prior Publication Data

US 2008/0073398 A1 Mar. 27, 2008

(51) Int. Cl.
*B60R 9/00* (2006.01)
*B60R 11/00* (2006.01)

(52) U.S. Cl. ................. 224/402; 224/497; 224/509; 224/519; 224/532; 224/549

(58) Field of Classification Search .......... 224/402, 224/403, 405, 495, 497, 509, 519, 521, 532, 224/549; 116/28 R, 30, 173; 211/80, 85.8, 211/171, 172
See application file for complete search history.

(56) References Cited

U.S. PATENT DOCUMENTS

| | | | |
|---|---|---|---|
| 4,632,354 A | 12/1986 | Asciutto | |
| 6,484,992 B1 * | 11/2002 | Svensson et al. | ............ 248/320 |
| 6,557,483 B2 | 5/2003 | Nathan | |
| 6,734,792 B1 | 5/2004 | McElveen | |
| 6,808,098 B1 | 10/2004 | Bickett, III et al. | |
| 2002/0033587 A1 | 3/2002 | McConnell | |
| 2003/0071185 A1 * | 4/2003 | Casapulla | .................. 248/534 |
| 2003/0094473 A1 | 5/2003 | Moore | |
| 2003/0213425 A1 * | 11/2003 | Spiegel | ...................... 116/173 |
| 2004/0041070 A1 | 3/2004 | Richardson | |
| 2006/0053667 A1 | 3/2006 | Andersen | |

* cited by examiner

*Primary Examiner*—Nathan J Newhouse
*Assistant Examiner*—Adam Waggenspack
(74) *Attorney, Agent, or Firm*—Dale J. Ream

(57) ABSTRACT

A display apparatus for use with a truck having a receiver hitch includes a mounting bracket having oppositely disposed first and second ends, the first end being configured to be received in the receiver hitch. The apparatus includes a main support member coupled to the second end of the bracket, the main support member being height adjustable. The main support member defines an elongate channel. At least one fastener is coupled to the main support member for movement along the elongate channel, the fastener being selectively securable at a desired position along the channel. The fastener includes an eyelet to which a flag or banner may be secured. The apparatus may also include at least one auxiliary support member pivotally coupled to the main support member for displaying another flag.

11 Claims, 10 Drawing Sheets

DISPLAY APPARATUS FOR A VEHICLE HAVING A RECEIVER HITCH

BACKGROUND OF THE INVENTION

This invention relates generally to display devices and, more particularly, to a flag display apparatus for use with a vehicle having a receiver hitch.

Many people desire to celebrate festive or patriotic events and occasions by displaying a flag or banner. For example, a person may display their country's national flag or display a flag or banner that promotes a particular sports team, such as a team flag, or that advertises a company or product, e.g. a company logo. A person may especially desire to publicly promote allegiance to a particular team when traveling to or from a live athletic event.

Various devices have been proposed in the art for displaying flags from a vehicle. Although assumably effective for their intended purposes, the existing devices do not interface directly with a vehicle's receiver hitch nor do they secure a flag apart from a flagpole. In addition, the existing devices for displaying flags are not height adjustable and adaptable for displaying multiple flags apart from traditional flagpoles.

Therefore, it would be desirable to have a flag display apparatus for use with a vehicle having a receiver hitch. Further, it would be desirable to have a flag display apparatus that can display a flag or flags on a vehicle apart from a traditional flagpole. Still further, it would be desirable to have a flag display apparatus for a vehicle that is height adjustable and that is adjustable to accommodate flags of different sizes. In addition, it would be desirable to have a display apparatus that enables use of a ball hitch even when the display apparatus mounting bracket is connected to the vehicle's receiver hitch.

SUMMARY OF THE INVENTION

The present invention includes a mounting bracket that may be removably inserted into and secured to a vehicle's receiver hitch. The display apparatus includes a main support member extending upwardly from the bracket, the main support member having a plurality of holes so as to be height adjustable relative to the mounting bracket. The main support member also defines an elongate channel adjacent its upper end. One or more fastener may be coupled to the main support member and may be selectively positioned and secured at a user determined position along the elongate channel. The fastener includes an eyelet to which a flag or banner may be releasably coupled with a clasp, latch, or other fastener. Since each fastener may be loosened for movement in the elongate channel and tightened at a desired position, flags of various sizes may be accommodated and displayed. The display apparatus may also include auxiliary support members that may be moved between retracted and extended configurations. When extended, the auxiliary support members enable multiple flags to be displayed simultaneously. The display apparatus also provides a ball hitch such that a trailer requiring a ball hitch attachment may still be coupled to a vehicle even when the display apparatus is coupled to the vehicle's receiver hitch.

Therefore, a general object of this invention is to provide a flag display apparatus for use with a vehicle having a receiver hitch.

Another object of this invention is to provide a flag display apparatus, as aforesaid, for displaying a flag apart from a traditional flagpole.

Still another object of this invention is to provide a flag display apparatus, as aforesaid, that is height adjustable and is adjustable to accommodate flags of various sizes.

Yet another object of this invention is to provide a flag display apparatus, as aforesaid, having auxiliary support members that enable the display of multiple flags simultaneously.

A further object of this invention is to provide a flag display apparatus, as aforesaid, having a ball hitch assembly which may be coupled to the receiver hitch even when the mounting bracket is connected thereto.

A still further object of this invention is to provide a flag display apparatus, as aforesaid, that is easy to use and economical to manufacture.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
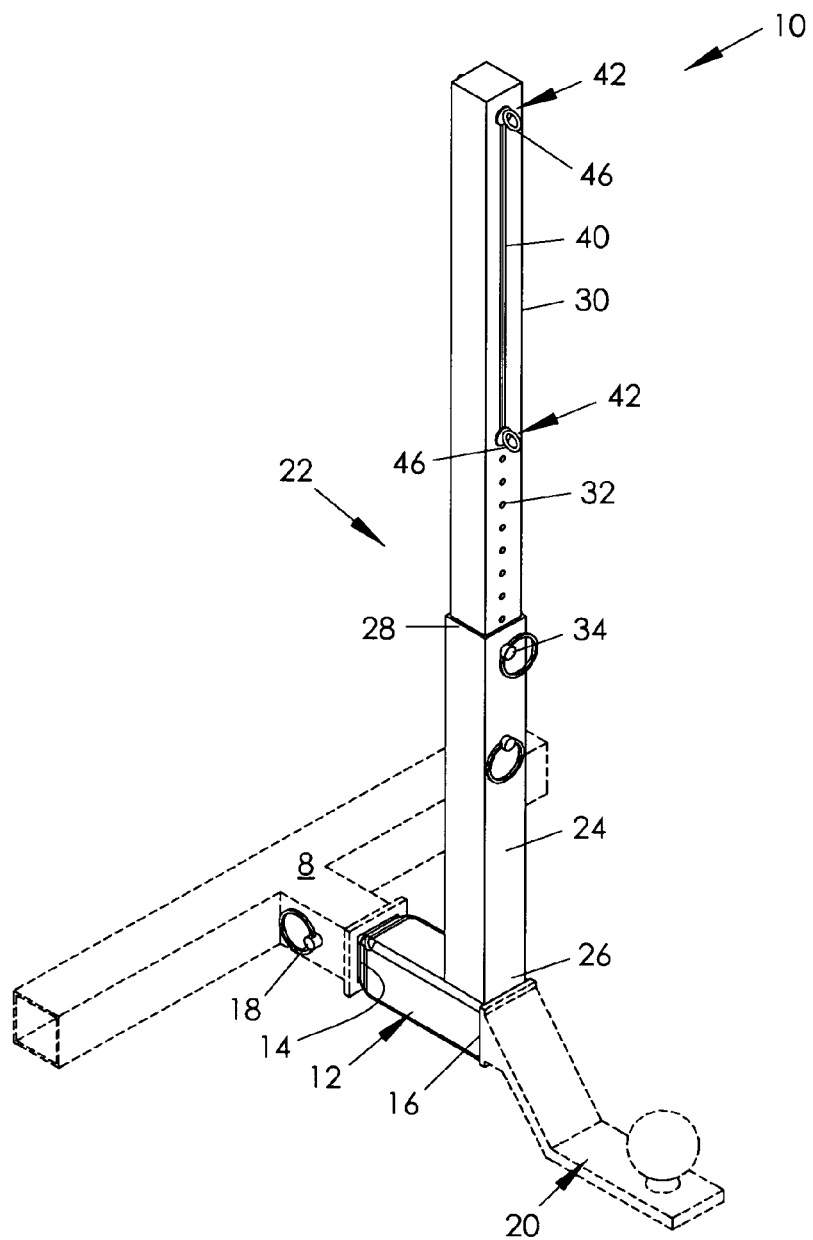
FIG. 1 is a perspective view of a display apparatus according to one embodiment of the present invention.

A display apparatus 10 for use with a vehicle having a receiver hitch 8 according to the present invention will now be described in detail with reference to FIGS. 1 through 10 of the accompanying drawings. More particularly, the display apparatus 10 includes a mounting bracket 12 having opposed first 14 and second 16 ends (FIG. 1). The receiver hitch 8 mounted to a vehicle such as a truck defines an open end and is generally hollow. The bracket 12 presents dimensions such that the first end 14 thereof may be inserted into the open end of the receiver hitch 8 (FIG. 1). The mounting bracket 12 may be selectively and releasably secured therein with a pin 18 or other suitable fastener. A ball hitch member 20 may be coupled to the second end 16 of the mounting bracket 12 and extend outwardly therefrom. Preferably, the ball hitch member 20 may be inserted into the mounting bracket 12, the bracket having a tubular construction and the second end 16 thereof defining an opening.

The display apparatus 10 further includes a main support member 22 coupled to the second end 16 of the mounting bracket 12 (FIG. 1). As shown in FIG. 1, the main support member 22 may be fixedly connected to an upper surface of the bracket 12 adjacent the second end 16 thereof and extends upwardly. The main support member 22 may include a first leg 24 having a generally tubular construction. The first leg 24 includes a lower end 26 connected to the mounting bracket 12 and an open upper end 28. The main support member 22 may further include a second leg 30 also having a generally tubular construction and dimensioned to be received into the first leg 24 through its open upper end 28 for relative movement therein. The second leg 30 is height adjustable relative to the first leg 24 as the main support member 22 includes means for maintaining the second leg 30 at a user-selectable position. More particularly, the second leg 30 may define a plurality of spaced apart holes 32 that selectively register with a corresponding adjustment aperture defined by the first leg adjacent its open upper end. A pin 34 or other suitable fastener may be utilized to maintain the second leg 30 at a desired position by insertion through appropriate holes 32 and aperture. Of course, other suitable means for height adjustment may also be included.

Figure 2:
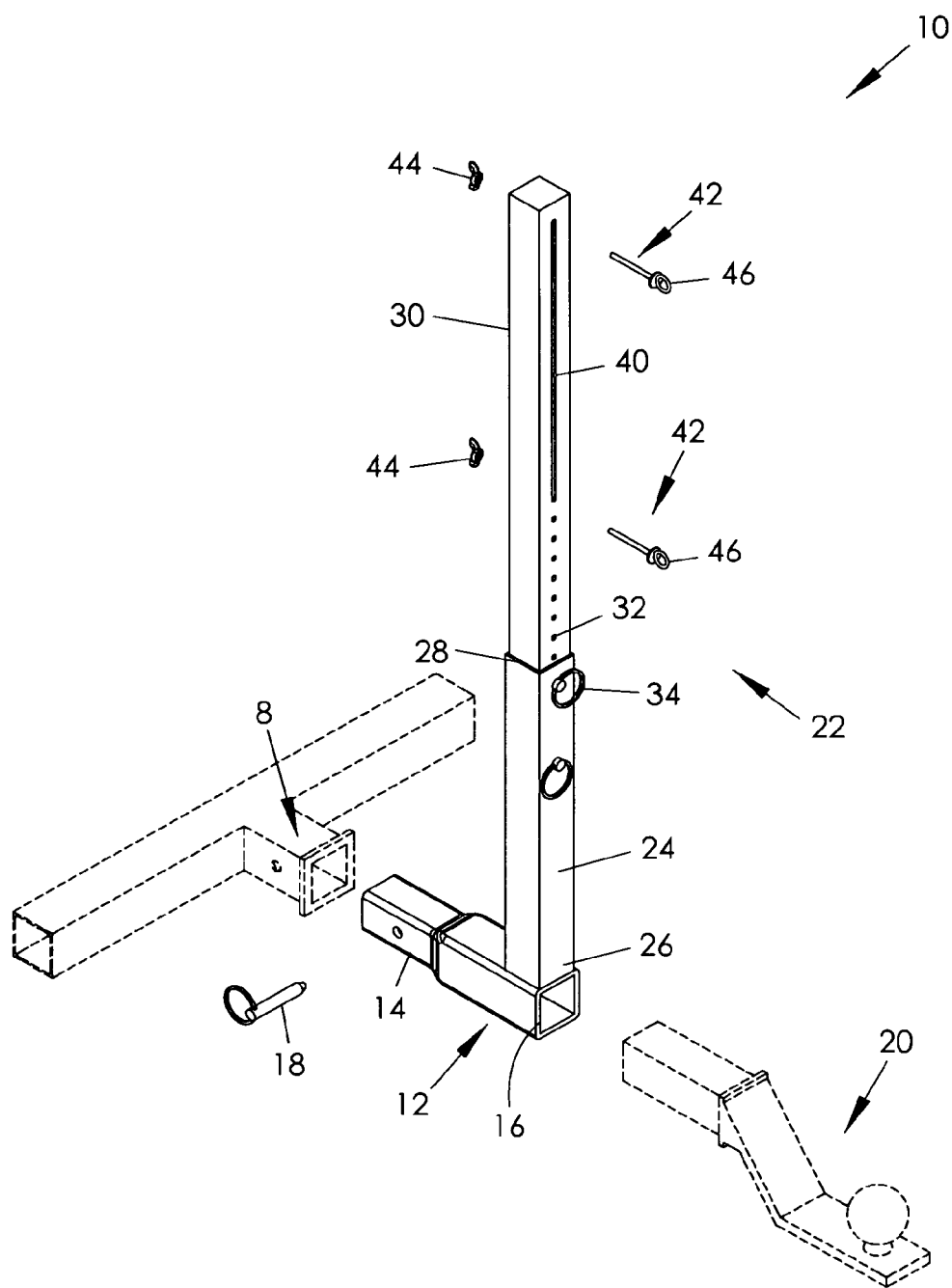
FIG. 2 is a partially exploded view of the display apparatus as in FIG. 1.
Figure 3:
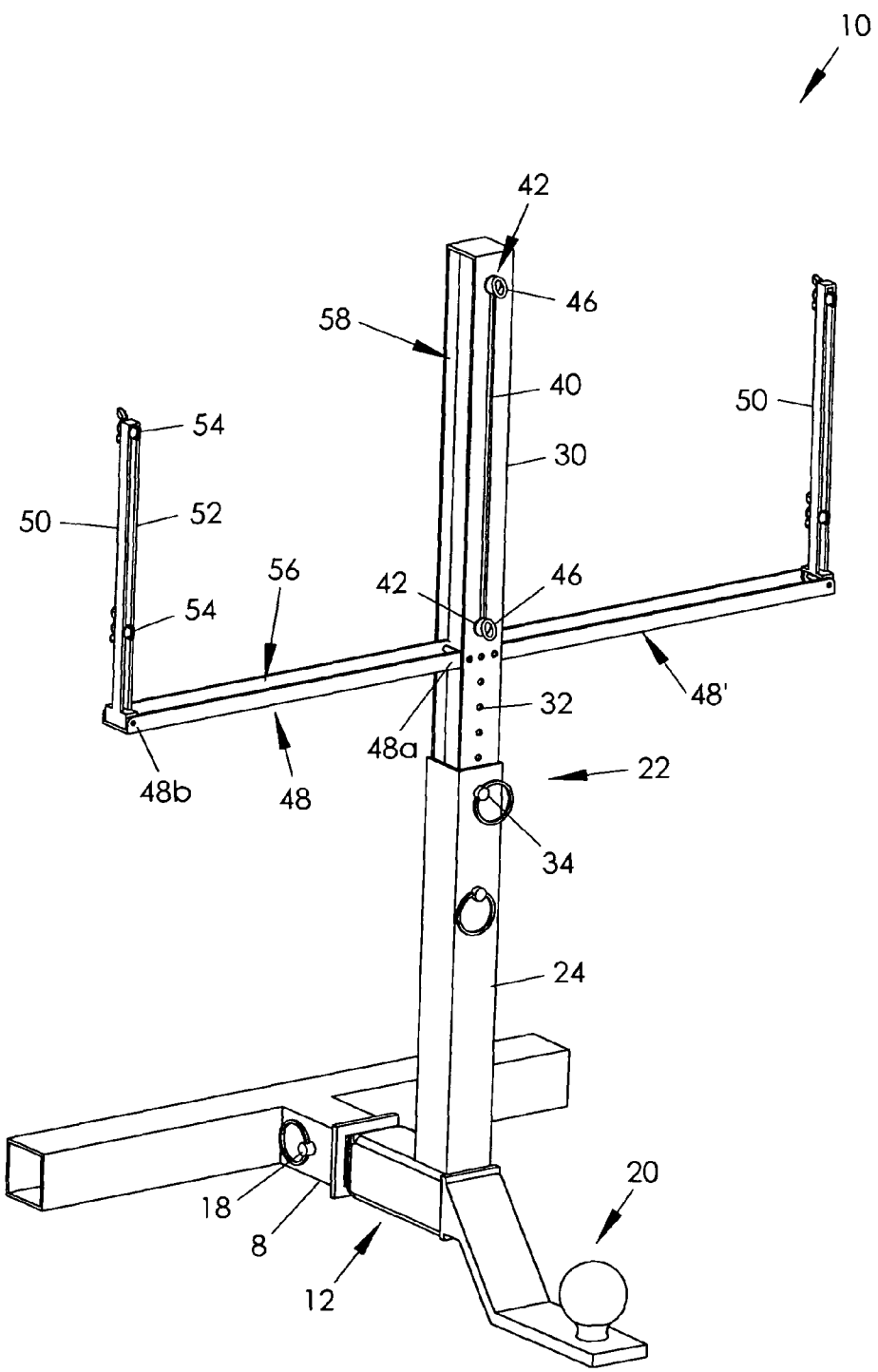
FIG. 3 is another perspective view of the display apparatus as in FIG. 1 having support arms and auxiliary support members at respective extended configurations.
Figure 4:
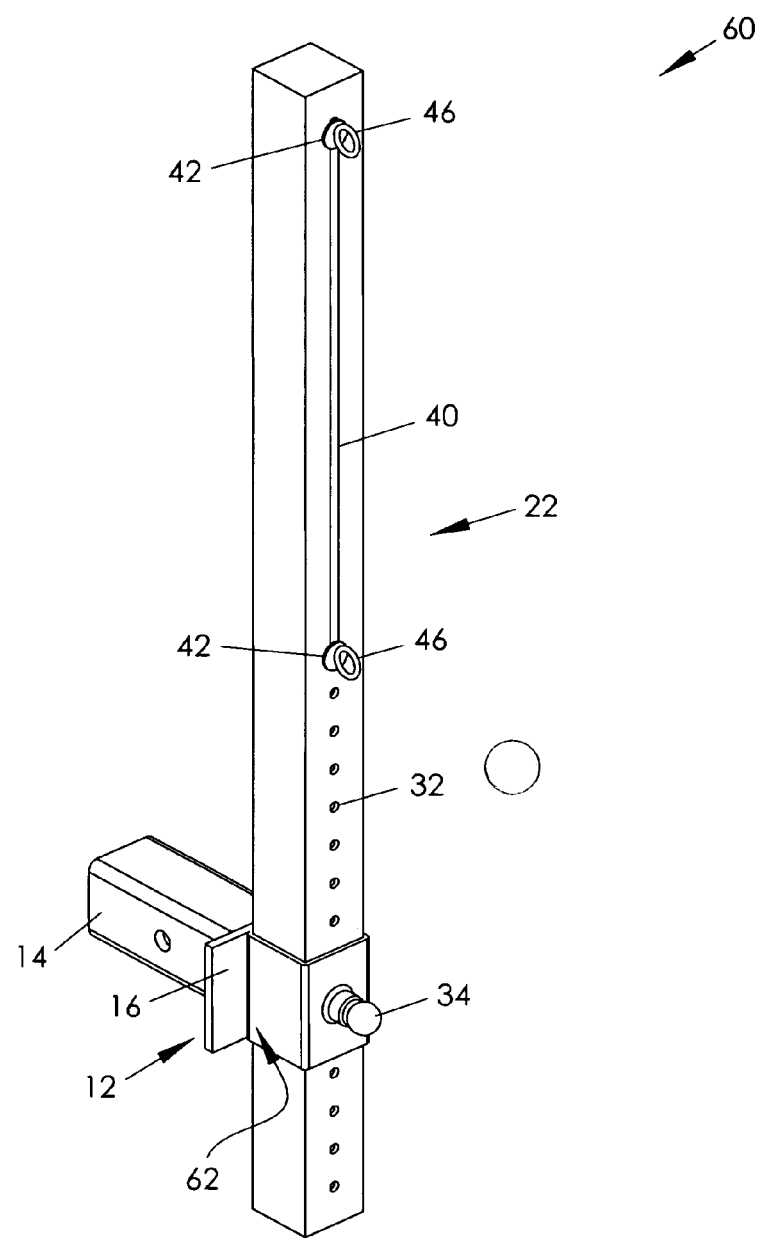
FIG. 4 is a front perspective view of a display apparatus according to another embodiment of the present invention.
Figure 5:
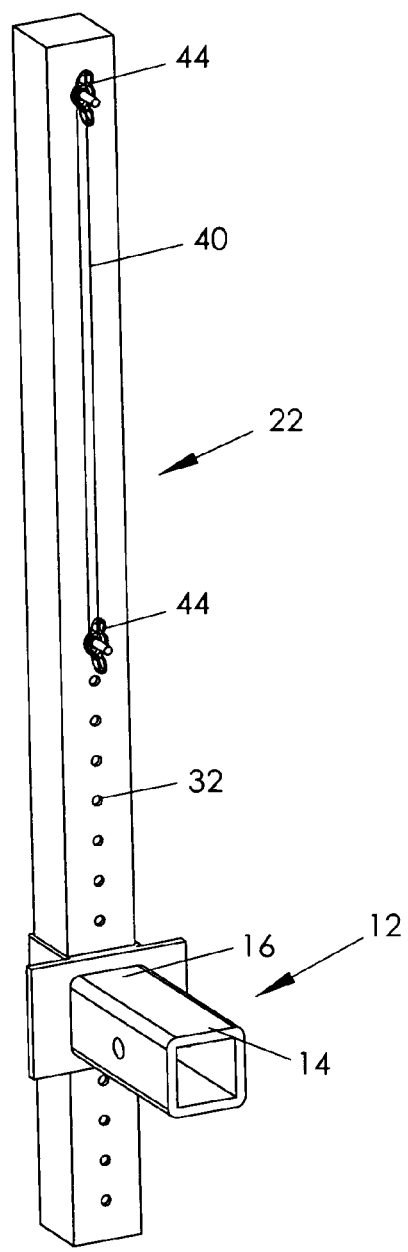
FIG. 5 is a rear perspective view of the display apparatus as in FIG. 4.
Figure 6:
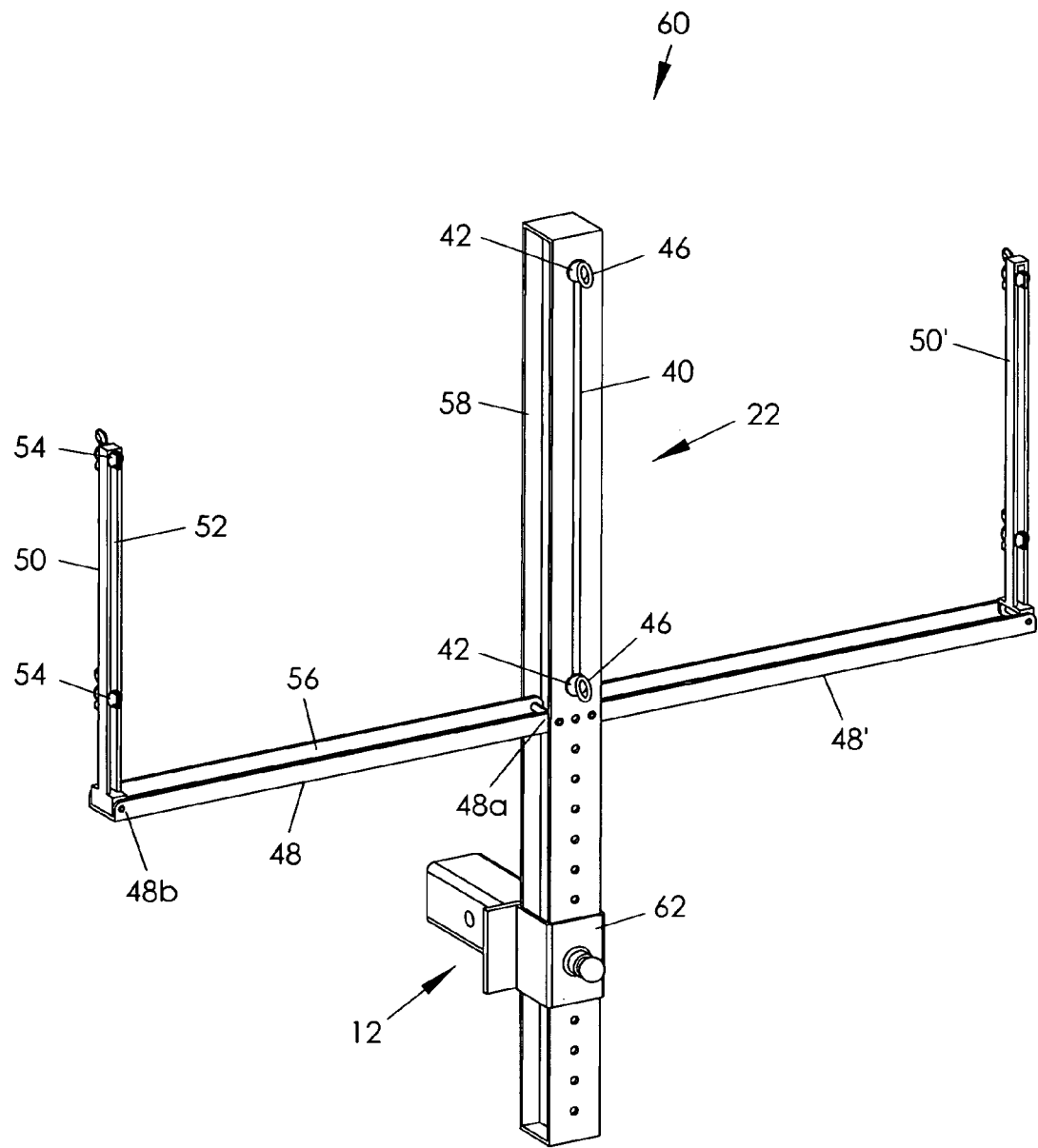
FIG. 6 is a front perspective view of the display apparatus as in FIG. 4 having support arms and auxiliary support members situated at respective extended configurations.
Figure 7:
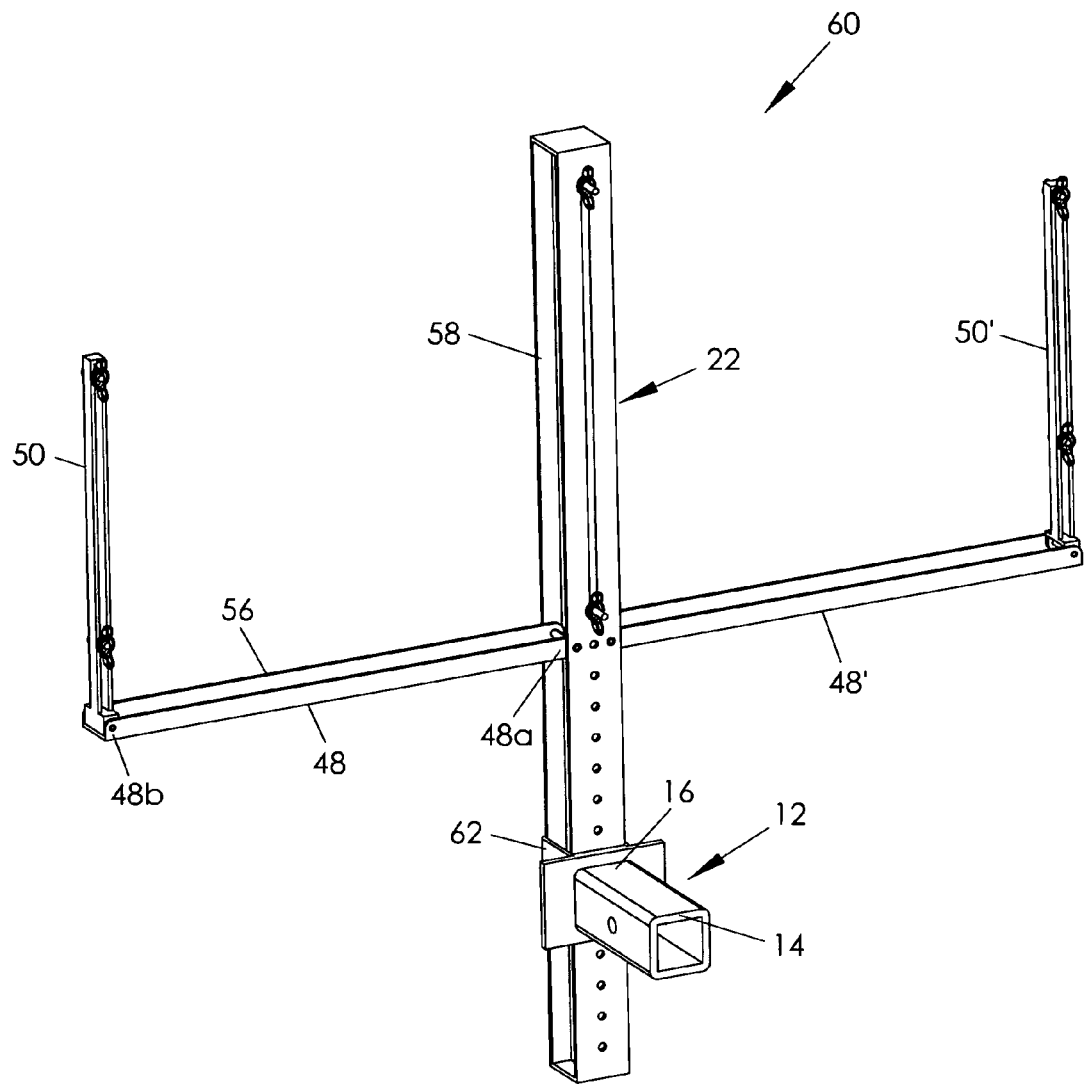
FIG. 7 is a rear perspective of the display apparatus as shown in FIG. 6.
Figure 8:
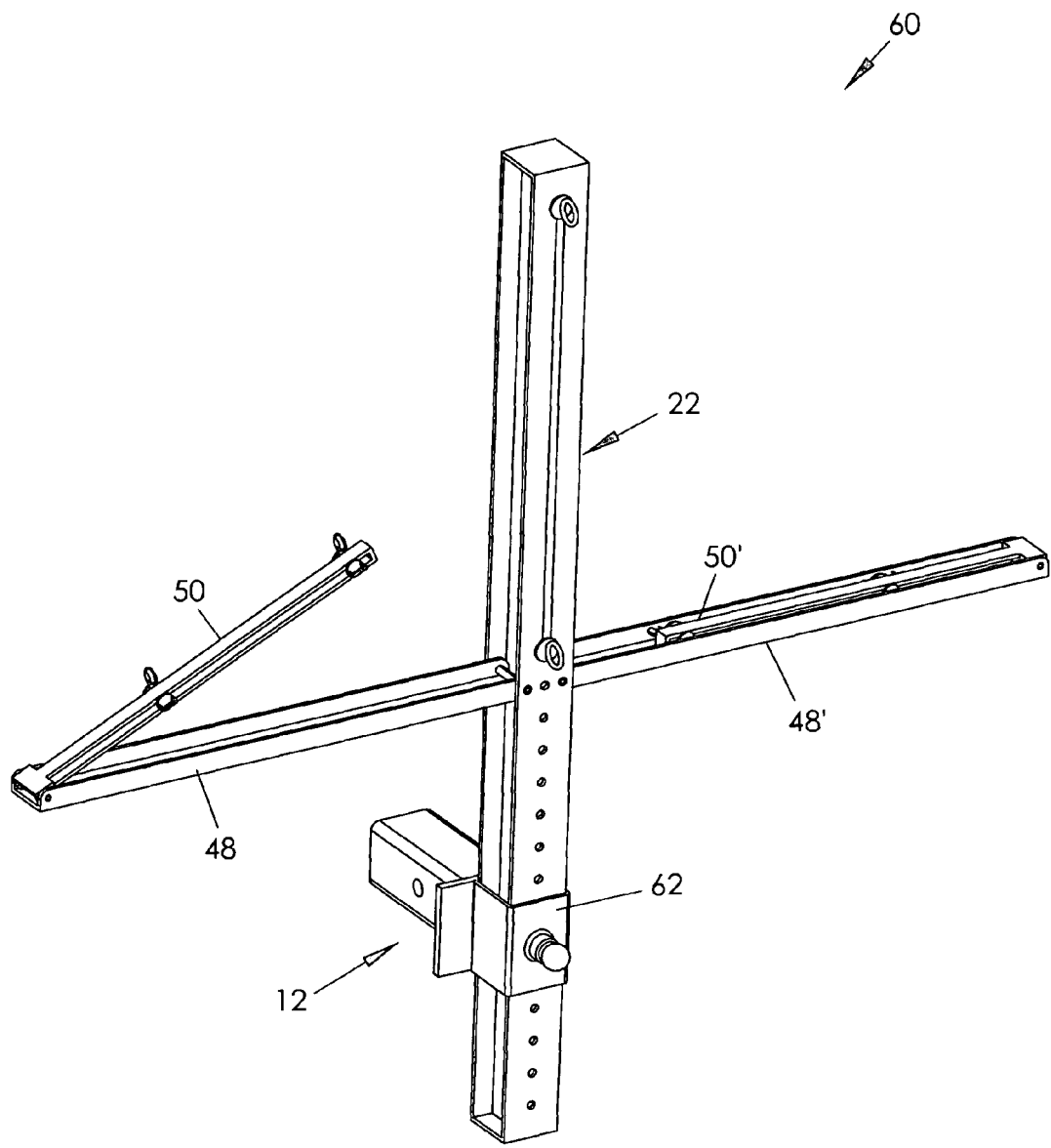
FIG. 8 is a front perspective view of the display apparatus as in FIG. 6 showing movement of the auxiliary support members from extended to retracted configurations.
Figure 9:
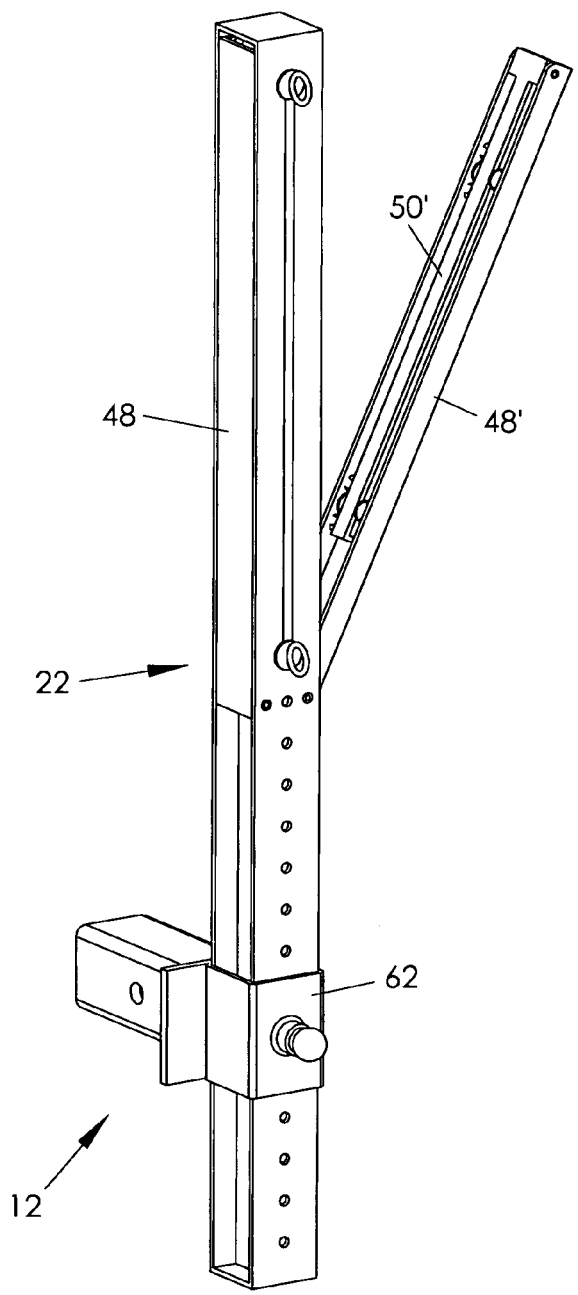
FIG. 9 is another front perspective view of the display apparatus as in FIG. 8 showing movement of the support arms from extended to retracted configurations.
Figure 10:
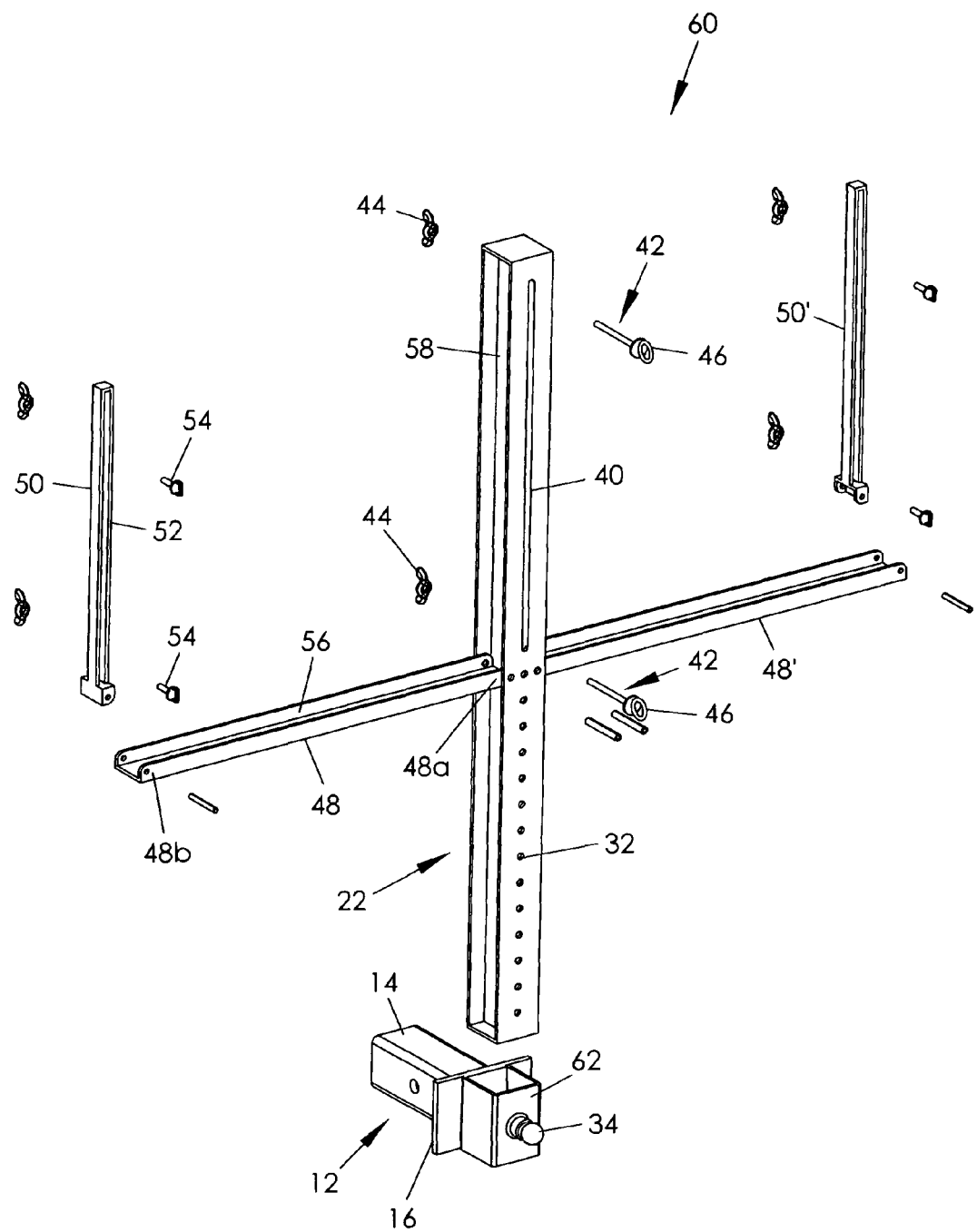
FIG. 10 is an exploded view of the display apparatus as in FIG. 6.

The main support member 22 defines an elongate channel 40 from a point adjacent an upper end thereof to a point substantially displaced from the upper end and adjacent the plurality of height adjustment holes 32 (FIG. 1). The elongate channel 40 extends entirely through the main support member 22 (e.g. from one side to its opposed side). As shown in FIG. 1, the elongate channel 40 is presented by the second leg 30. At least one fastener 42 is coupled to the main support member 22 for relative movement along the elongate channel 40. Means are included for securing the at least one fastener 42 at a user-selected position along the channel 40. For example, the fastener 42 may be secured by a wing nut 44 such that its position may be quickly and easily changed and the fastener 42 re-secured (FIGS. 2 and 3). The at least one fastener 42 also includes an eyelet 46 such that a corresponding fastener, e.g. a hook, clasp, buckle, or the like, of a flag or banner (not shown) may be coupled thereto as will be further described later. By re-adjusting the fastener's position along the elongate channel 40, the height at which the flag is displayed may be adjusted. As shown in the drawings, a pair of fasteners 42 may be coupled to the main support member 22 and each adjusted as described above so as to better secure a flag or banner and to accommodate flags of various sizes.

Further, the display apparatus 10 may include support arms and auxiliary support members for displaying one or more additional flags or banners. With specific reference to FIG. 3, the display apparatus 10 may include a first support arm 48 having opposed first 48a and second 48b ends, the first end 48a being pivotally coupled to a side wall of the second leg 30 of the main support member 22 such that the first support arm 48 is pivotally movable between retracted and extended configurations relative thereto. A first auxiliary support member 50 is pivotally coupled to the second end of the first support arm 48 for pivotal movement between retracted and extended configurations. The first auxiliary support member 50 defines an elongate auxiliary channel 52 and fasteners 54 for operation as described above relative to the main support member 22. The display apparatus 10 may also include a second support arm 48' and second auxiliary support member 50' having constructions substantially similar to those of the first support arm 48 and first auxiliary support member 50. Accordingly, primed reference numerals are presented in the drawings to reference similar components.

Still further, various storage channels are provided for containing the auxiliary support members and support arms at their respective retracted configurations. More particularly, each support arm 48, 48' defines respective auxiliary support member storage channels 56. Each auxiliary support member storage channel 56 includes a configuration for receiving a respective auxiliary support member 50, 50' in a nested relationship when the respective auxiliary support member 50, 50' is at its retracted configuration. Similarly, sides of the second leg 30 of the main support member 22 define support arm storage channels 58. Each support arm storage channel 58 includes a configuration for receiving a respective support arm 48, 48' in a nested relationship when the respective support arm is at its retracted configuration.

A display apparatus 60 according to another embodiment of the present invention is shown in FIGS. 4 to 10 and includes a construction that is substantially similar to the construction described above except as specifically noted below. The same reference numerals are utilized for like elements. More particularly, the mounting bracket 12 and main support member 22 present a variation of construction and will be described below. A sleeve 62 is connected to the second end 16 of the mounting bracket 12 and has a generally hollow construction. The sleeve 62 defines an open top and bottom such that the main support member 22 may be received therethrough for relative up and down movement. The main support member 22 defines the elongate channel 40 and plurality of holes 32 as described previously such that the main support member 22 may be maintained at a user-selected height adjustable position, such as with a spring-loaded pin or the like, and a flag or banner may be secured thereto.

In addition, the display apparatus 60 includes support arms 48, 48' and auxiliary support members 50, 50' having a construction substantially similar to that described with reference to the display apparatus 10 first described above. The main support member 22 and support arms 48, 48' also present the storage channels as described previously.

In use, the mounting bracket 12 may be inserted into the receiver hitch 8 of a vehicle, such as a pickup truck, and secured therein. The height of the main support member 22 may then be adjusted, such as by vertical movement within the sleeve 62 or relative movement of first 24 and second 26 legs. The fasteners 42 may then be loosened and adjusted along the elongate channel 40 and then re-secured. A flag or banner may then be secured to the eyelet 46 of one or more fastener 42 such that the flag will be displayed, especially when the vehicle is driven. If multiple flags are desired, one or more support arms 48, 48' and auxiliary support members 50, 50' may be moved to their extended configurations and additional flags secured thereto.

It is understood that while certain forms of this invention have been illustrated and described, it is not limited thereto except insofar as such limitations are included in the following claims and allowable functional equivalents thereof.

What is claimed is as follows:

1. A display apparatus for use with a vehicle having a receiver hitch, comprising:
    a mounting bracket having oppositely disposed first and second ends, said first end being slidably receivable in the vehicle receiver hitch;
    a main support member coupled to said second end of said bracket and extending upward, said main support member defining an elongate channel;
    at least one fastener coupled to said main support member for movement along said channel, said at least one fastener having means for securing a flag;

wherein said main support member includes:
a first leg having a generally tubular configuration, said first leg having a lower end fixedly connected to said second end of said bracket and an upper end defining an opening;
a second leg having a generally tubular configuration receivable in said first leg through said opening for movement therein;
means for maintaining said second leg at a selected position relative to said first leg;
a first support arm having first and second ends, said first support arm first end being pivotally coupled to a side wall of said second leg for movement between retracted and extended configurations;
a first auxiliary support member pivotally coupled to said first support arm second end for movement between retracted and extended configurations, said first auxiliary support member defining an elongate first auxiliary channel; and
at least one fastener coupled to said first auxiliary support member for movement along said first auxiliary channel, said at least one fastener having means for securing a flag when said first support arm and said first auxiliary support member are at respective extended configurations.

2. The display apparatus as in claim 1 further comprising:
means for removably securing said mounting bracket to said receiving hitch; and
means for securing said at least one fastener at user-determined positions in said channel.

3. The display apparatus as in claim 1 further comprising a ball hitch member connected to said second end of said bracket and extending outwardly therefrom.

4. The display apparatus as in claim 1 wherein said second leg defines said elongate channel.

5. The display apparatus as in claim 1 further comprising a ball hitch connected to said second end of said bracket and extending outwardly therefrom.

6. The display apparatus as in claim 1 further comprising:
a second support arm having first and second ends, said second support arm first end being pivotally coupled to another side wall of said second leg for movement between retracted and extended configurations;
a second auxiliary support member pivotally coupled to said second support arm second end for movement between retracted and extended configurations, said second auxiliary support member defining an elongate second auxiliary channel; and
at least one fastener coupled to said second auxiliary support member for movement along said second auxiliary channel, said at least one fastener having means for securing a flag when said second support arm and said second auxiliary support member are at respective extended configurations.

7. The display apparatus as in claim 6 wherein:
said first and second support arms define respective auxiliary support member storage channels, each said respective auxiliary support member storage channel having a configuration such that said first and second auxiliary support members nest therein when at respective said retracted configurations; and
said side and said another side of said second leg define respective support arm storage channels each having a configuration such that said first and second support arms nest therein when at respective said retracted configurations.

8. A display apparatus for use with a vehicle having a receiver hitch, comprising:
a mounting bracket having oppositely disposed first and second ends, said first end being selectively mounted in the vehicle receiver hitch;
a main support member coupled to said second end of said bracket and extending upward, said main support member defining an elongate channel; and
a pair of fasteners coupled to said main support member for movement along said channel, each of said pair of fasteners including an eyelet for securing a flag;
means for securing each of said pair of fasteners at a user-selected position along said elongate channel;
wherein said main support member includes:
a first leg having a generally tubular configuration, said first leg having a lower end fixedly connected to said second end of said bracket and an upper end defining an opening;
a second leg having a generally tubular configuration receivable in said first leg through said opening for movement along said opening ;
means for maintaining second leg at a selected position relative to said first leg;
a pair of support arms each having first and second ends, said support arm first ends being pivotally coupled to opposed sides of said second leg of said main support member for movement between retracted and extended configurations;
a pair of auxiliary support members, each auxiliary support member being pivotally coupled to a respective second end of a respective support arm for movement between retracted and extended configurations, each auxiliary support member defining an elongate auxiliary channel; and
at least a pair of fasteners coupled to respective elongate channels of respective auxiliary support members for movement along respective elongate auxiliary channels, said at least a pair of fasteners including means for securing a flag.

9. The display apparatus as in claim 8 further comprising a ball hitch connected to said second end of said bracket and extending outwardly therefrom.

10. The display apparatus as in claim 9, further comprising:
a first support arm having first and second ends, said first support arm first end being pivotally coupled to a side wall of said main support member for movement between retracted and extended configurations;
a first auxiliary support member pivotally coupled to said first support arm second end for movement between retracted and extended configurations, said first auxiliary support member defining a first elongate auxiliary channel;
at least one fastener coupled to said first auxiliary support member for movement in said first auxiliary channel, said at least one fastener having means for securing a flag when said first support arm and said first auxiliary support member are at respective extended configurations;
a second support arm having first and second ends, said second support arm first end being pivotally coupled to another side wall of said main support member for movement between retracted and extended configurations;
a second auxiliary support member pivotally coupled to said second support arm second end for movement between retracted and extended configurations, said second auxiliary support member defining a second elongate auxiliary channel; and at least one fastener coupled to said second auxiliary support member for movement in said second elongate auxiliary channel, said at least one fastener having means for securing a flag when said second support arm and said second auxiliary support member are at respective extended configurations.

11. The display apparatus as in claim 10, wherein:

said first and second support arms define respective auxiliary support member storage channels, each said respective auxiliary support member storage channel having a configuration such that respective said auxiliary support members nest therein when at respective said retracted configurations; and said side and said another side of said main support member define respective support arm storage channels each having a configuration such that said first and second support arms nest therein when at respective said retracted configurations.

* * * * *